(12) United States Patent
Withrow et al.

(10) Patent No.: US 11,830,003 B2
(45) Date of Patent: *Nov. 28, 2023

(54) AUTHENTICATION-TRIGGERED PROCESSES

(71) Applicant: Alitheon, Inc., Bellevue, WA (US)

(72) Inventors: Justin Lynn Withrow, Bellevue, WA (US); David Justin Ross, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 471 days.

This patent is subject to a terminal disclaimer.

(21) Appl. No.: 17/096,749

(22) Filed: Nov. 12, 2020

(65) Prior Publication Data
US 2021/0081940 A1 Mar. 18, 2021

Related U.S. Application Data

(63) Continuation of application No. 15/490,774, filed on Apr. 18, 2017, now Pat. No. 10,867,301.
(Continued)

(51) Int. Cl.
*G06Q 20/40* (2012.01)
*G06F 16/583* (2019.01)
(Continued)

(52) U.S. Cl.
CPC ....... *G06Q 20/4016* (2013.01); *G06F 16/583* (2019.01); *G06F 16/5866* (2019.01);
(Continued)

(58) Field of Classification Search
CPC .................................................. G06Q 20/401
See application file for complete search history.

(56) References Cited

U.S. PATENT DOCUMENTS 4,218,674 A 8/1980 Brosow et al.
4,423,415 A 12/1983 Goldman
(Continued)

FOREIGN PATENT DOCUMENTS

DE 102006005927 A1 8/2007
EP 0439669 A2 8/1991
(Continued)

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.
(Continued)

*Primary Examiner* — Edward Chang
(74) *Attorney, Agent, or Firm* — Brake Hughes Bellermann LLP

(57) ABSTRACT

Digital fingerprints are used to authenticate a physical item. Authentication attempts, may automatically trigger various predetermined processes. Different processes may take place depending on whether the authentication was successful. The process(es) may be computer-implemented, for example, using executable scripts. The triggered process(es) may be immediate ("real-time"), or delayed, deferred, or batched, etc. At least one additional process is triggered or initiated, locally or remotely, by a least one affirmative authentication result or at least one additional process s triggered, by at least one unsuccessful authentication attempt. In one example, a combination of purchase and authentication of an item is combined into a single action.

20 Claims, 12 Drawing Sheets

Related U.S. Application Data

(60) Provisional application No. 62/324,136, filed on Apr. 18, 2016.

(51) Int. Cl.
    *G06F 16/58*     (2019.01)
    *G06Q 10/087*     (2023.01)
    *G06V 20/80*     (2022.01)
    *G06Q 30/018*     (2023.01)
    *G06Q 30/0601*     (2023.01)

(52) U.S. Cl.
CPC ......... *G06Q 10/087* (2013.01); *G06Q 30/018* (2013.01); *G06Q 30/0185* (2013.01); *G06Q 30/0613* (2013.01); *G06V 20/80* (2022.01)

(56) References Cited

U.S. PATENT DOCUMENTS

| | | |
|---|---|---|
| 4,677,435 A | 6/1987 | Causse et al. |
| 4,700,400 A | 10/1987 | Ross |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 10,199,886 B2 | 2/2019 | Li et al. |
| 10,505,726 B1 | 12/2019 | Andon et al. |
| 10,540,664 B2 | 1/2020 | Ross et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1* | 6/2002 | Dutta ................... G06Q 20/401 |
| | | 705/26.1 |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |

(56) References Cited

U.S. PATENT DOCUMENTS

| | | |
|---|---|---|
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2012/0042171 A1 | 2/2012 | White et al. |
| 2012/0130868 A1 | 5/2012 | Loeken |
| 2012/0185393 A1 | 7/2012 | Atsmon et al. |
| 2012/0199651 A1 | 8/2012 | Glazer |
| 2012/0250945 A1 | 10/2012 | Peng et al. |
| 2013/0212027 A1 | 8/2013 | Sharma et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0067376 A1* | 3/2015 | Cueva Gonzalez ...... G06F 1/28 713/340 |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0335520 A1 | 11/2016 | Ross et al. |
| 2017/0032285 A1* | 2/2017 | Sharma ................... G06N 3/08 |
| 2017/0132458 A1 | 5/2017 | Short et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0153822 A1 | 5/2020 | Land et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3249581 A1 | 11/2017 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2012145842 A1 | 11/2012 |
| WO | 2013126221 A1 | 8/2013 |

(56) References Cited

FOREIGN PATENT DOCUMENTS

| WO | 2013173408 A1 | 11/2013 |
|---|---|---|
| WO | 2015004434 A1 | 1/2015 |
| WO | 2016081831 A1 | 5/2016 |

OTHER PUBLICATIONS

Beekhof et al., "Secure Surface Identification Codes," Proceeding of the SPIE 6819: Security Forensics, Steganography, and Watermarking of Multimedia Contents X:68190D, 2008. (12 pages).
Boa et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.
Buchanan et al., "Fingerprinting documents and packaging," Nature 436 (7050): 475, 2005.
Di Paola et al., "An Autonomous Mobile Robotic System for Surveillance of Indoor Environments," International Journal of Advanced Robotic Systems 7(1): 19-26, 2010.
Drew, M. S., et al., "Sharpening from Shadows: Sensor Transforms for Removing Shadows using a Single Image," Color and Imaging Conference, vol. 5, Society for Imaging Science and Technology, 2009, pp. 267-271.
Ebay, "eBay Launches Must-Have iPhone App RedLaser 3.0" https:/www.ebayinc.com/stories/news/ebay-launches-musthave-iphon-app-redlaser30/, Nov. 18, 2011 (Year: 2011), 8 pages.
Entropy.com Website History, Wayback Machine; https://web.archive.org/web/20160330060808/https://www.entrupy.com/; Mar. 30, 2016 (Year: 2016), 2 pages.
Farid, "Digital Image Forensics", Dartmouth CS 89/189, Sprint 2013; 199 pages.
Fischler et al., "Random Sample Consensus: A Paradigm for Model Fitting with Applications to Image Analysis and Automated Cartography," Communication of the ACM 24(6); 381-395, 1981.
Huang et al., "A Novel Binarization Algorithm for Ballistic Imaging Systems," 3rd International Congress on Image and Signal Processing, Yantai, China, Oct. 16-18, 2010, pp. 1287-1291.
Huang, et al., "An Online Ballistics Imaging System for Firearm Identification"; 2nd International Conference on Signal Processing Systems, Dalian, China, Jul. 5-7, 2010, vol. 2, pp. 68-72.
Kartik et al., "Security System with Face Recognition, SMS Alert and Embedded Network Video Monitoring Terminal," International Journal of Security, Privacy and Trust Management 2(5):9-19, 2013.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Li, "Firearm Identification System Based on Ballistics Image Processing," Congress on Image and Signal Processing, School of Computer and Information Science, Faculty of Computing, Health and Science Edith Cowan University, Perth, Australia pp. 149-154.
Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.
Matsumoto et al., "Nano-artifact metrics based on random collapse of resist," Scientific Reports 4:6142, 2014 (5 pages).
Mistry et al., "Comparison of Feature Detection and Matching Approaches: SIFT and SURF," Global Research and Development Journal for Engineering, vol. 2, Issue 4, Mar. 2017, 8 pages.
NCOA Link at http:/ /ribbs.usps.gov/ncoalink/ncoalink_print.htm; dated May 27, 2009; 3 pages.
Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 1 page.
Rublee et al., "ORB: an efficient alternative to SIFT or Surf," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Schwabe Williamson & Wyatt, PC—Listing of Related Cases; dated Sep. 16, 2017; 2 pages.
Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.
Shi et al., "Smart Cameras: Fundamentals and Classification," Chapter 2, Belbachir (ed.), Smart Cameras, Springer, New York, New York, USA 2010, pp. 19-34.
Shields, "How To Shop Savvy With Red Laser," published online on Mar. 22, 2010; https ://i phone .appstomn .net/reviews/lifesty le/how-to-shop-savvy-with-redlaser /, downloaded Mar. 22, 2010, 8 pages).
Smith, "Fireball: A Forensic Ballistic Imaging System: Proceedings of the 31st Annual International Carnahan Conference on Security Technology," Canberra, Australia, Oct. 15-17, 1997, pp. 64-70.
Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.
United States Postal Service Publication 28 "Postal Addressing Standards", dated Jul. 2008; text plus Appendix A only; 55 pages.
United States Postal Service, "NCOALink Systems", http:/ /www.usps.com/ncsc/addressservices/moveupdate/changeaddress.htm, website accessed Jun. 23, 2010, 2 pages.
Veena et al., "Automatic Theft Security System (Smart Surveillance Camera)," Computer Science & Information Technology 3:75-87, 2013.
Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.
Farid, Ahmed, et al., "Integrated fingerprint verification method using a composite signature-based watermarking technique", Optical Engineering, The Catholic University of America, (Year: 2007), 6 pages.

\* cited by examiner

FIG. 6 Sample Authentication Regions

AUTHENTICATION AT DELIVERY

AUTHENTICATION-TRIGGERED PROCESSES

PRIORITY CLAIM

This application is continuation of U.S. non-provisional patent application Ser. No. 15/490,774 filed Apr. 18, 2017, which is a non-provisional of, and claims priority to U.S. provisional application No. 62/324,136 filed Apr. 18, 2016, hereby incorporated by reference as though fully set forth.

BACKGROUND

Many different approaches are known to uniquely identify and authenticate objects, including labeling and tagging strategies using serial numbers, bar codes, holographic labels, RFID tags, and hidden patterns using security inks or special fibers. All of these methods can be duplicated, and many add substantial costs to the production of the goods sought to be protected. Physical labels and tags are also themselves at risk of being lost, stolen, or counterfeited.

SUMMARY OF THE PRESENT DISCLOSURE

The following is a summary of the present disclosure in order to provide a basic understanding of some features and context. This summary is not intended to identify key/critical elements of the disclosure or to delineate the scope of the disclosure. Its sole purpose is to present some concepts of the present disclosure in a simplified form as a prelude to a more detailed description that is presented later.

There are many known approaches to establishing or reestablishing the authenticity of an object, including secure supply chains, expert assessment, and counterfeit detection. There are also many ways in which a buyer can complete the purchase of an item. Amazon's "one-click" method for making online purchases and the check-out process in brick-and-mortar establishments are just two examples. What is lacking, however, and is provided by the current disclosure, is the ability to combine authentication events with other events and processes—such as an authentication and a purchase—into a single process or event.

In an embodiment, a method to attempt authentication of an object comprises the steps of—acquiring digital image data of at least a portion of an object by scanning a portion of the object; analyzing the image data to form a digital fingerprint of the object, wherein the digital fingerprint is responsive to the object itself and does not rely upon reading or recognizing information from any labels, tags, integrated materials, unique identification characters, codes, or other items that were added to the object for the purpose of identification; querying a database based on the digital fingerprint to obtain a result, wherein the database stores fingerprints from one or more known-authentic objects, and the result includes an indication as to whether the digital fingerprint matches a digital fingerprint stored in the database, and based on the result, triggering at least one predetermined action.

Such a method may further include attempting to authenticate a second object to obtain a second result; and, based on a combination of the result and the second result, triggering a predetermined action.

Additional aspects and advantages of this disclosure will be apparent from the following detailed description of preferred embodiments, which proceeds with reference to the accompanying drawings.

BRIEF DESCRIPTION OF THE DRAWINGS

In order to describe the manner in which the above-recited and other advantages and features of the present disclosure can be obtained, a more particular description follows by reference to the specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF PREFERRED EMBODIMENTS

Figure 1A:
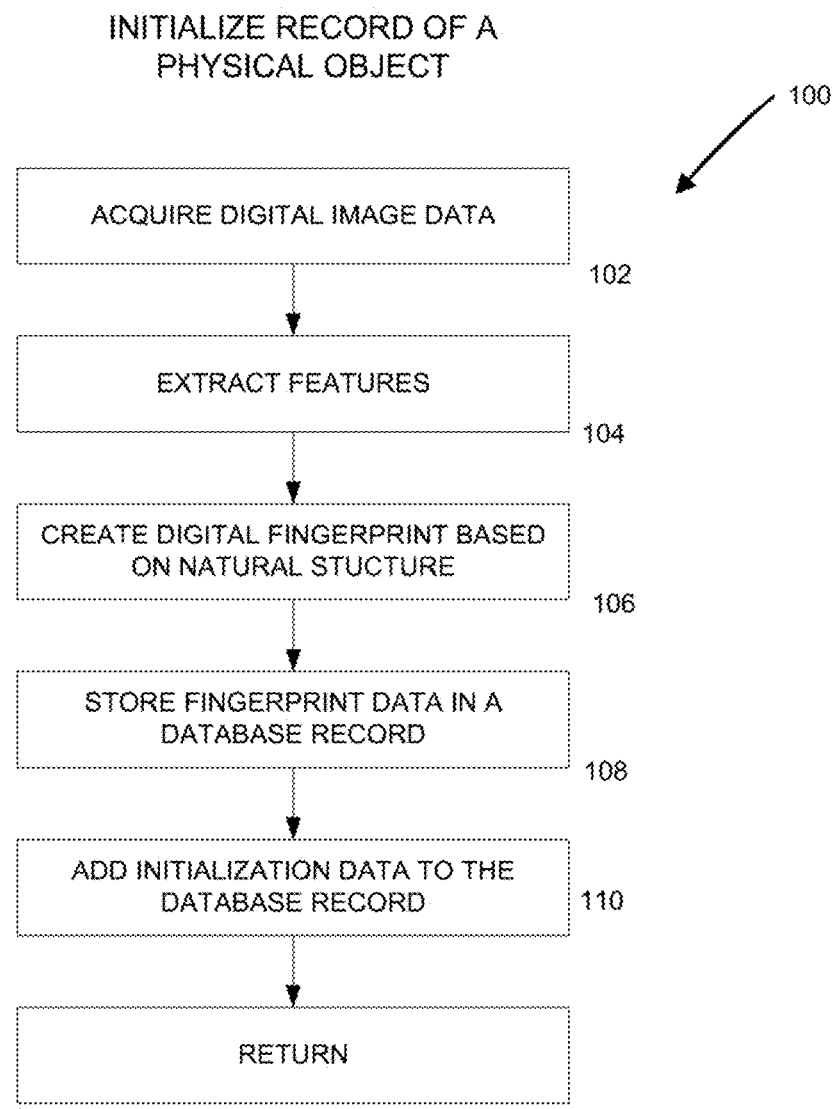
FIG. 1A is a simplified flow diagram illustrating a method for creating and recording a digital fingerprint of an object in a database.

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authentication Regions

Because digital fingerprinting works with many different types of objects, it may be useful to define what regions of digital images of objects are to be used for the extraction of features for authentication purposes. The chosen regions may vary for different classes of objects. In some embodiments a chosen region may be the image of the entire object; in other embodiments chosen regions may be one or more sub-regions of the image of the object. For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used (see FIG. 6) to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

Figure 6:
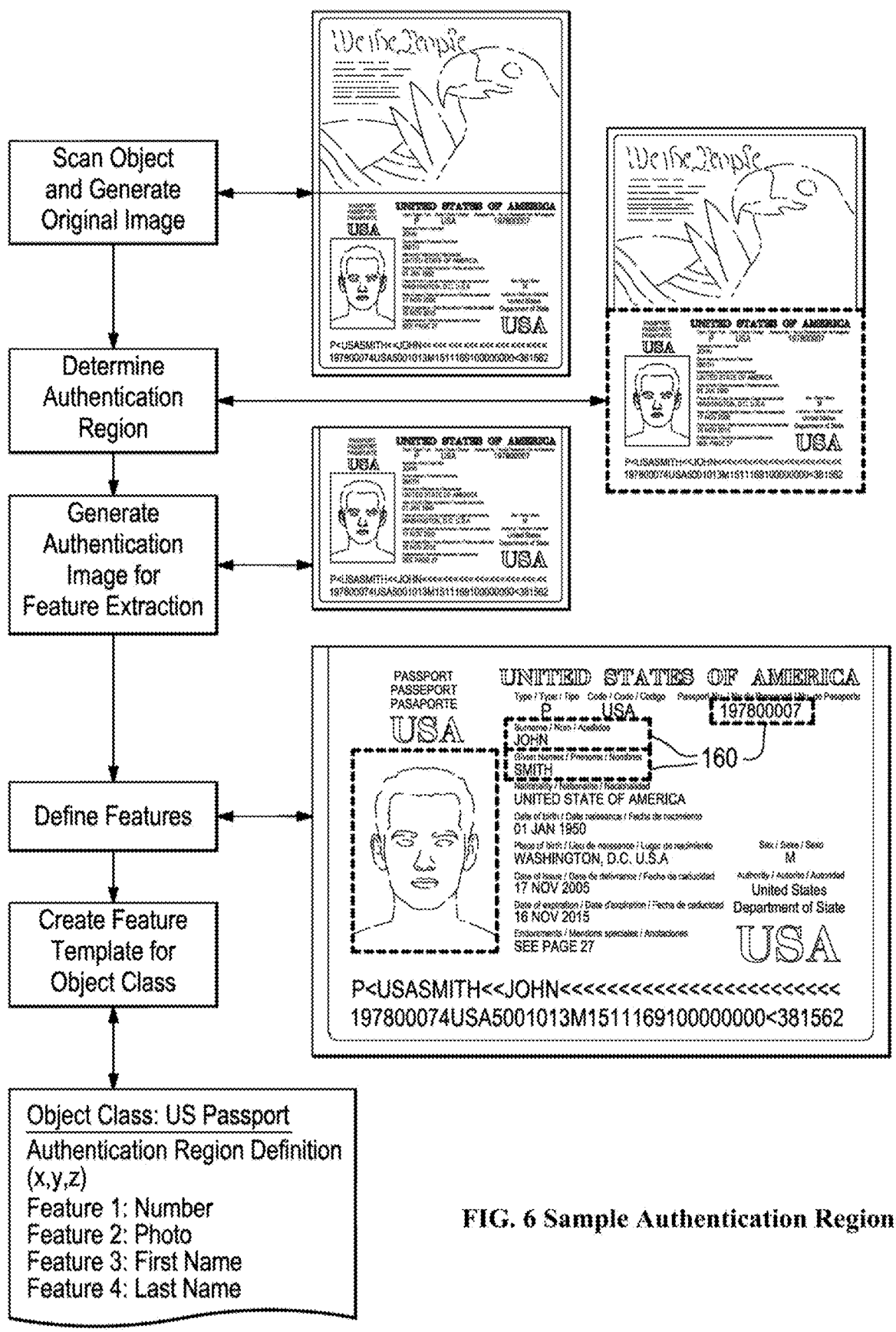
FIG. 6 illustrates an example of authentication region and object feature definition for a U.S. passport.

In one embodiment, a passport may provide an example of feature extractions from multiple authentication regions; see FIG. 6. In the case of a passport, the features chosen for authentication may be extracted from regions containing specific identification information such as the passport number, the recipient name, the recipient photo, etc., as illustrated in FIG. 6. In some examples, a user may define a feature template specifying the regions whose alteration from the original would invalidate the passport, such as the photo, identifying personal data, or other regions considered important by the user.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning a clothing label may be preferable to scanning an entire garment. Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc. and is not limited to the use of visible light or to the use of light at all (as previously noted, sonar and ultrasound are, for example, appropriate scanning technologies).

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed. For instance, wine may be put into a glass bottle and a label affixed to the bottle. Since it is possible that a label may be removed and re-applied elsewhere merely using the label itself as an authentication region may not be sufficient. In this case the authentication region may be defined so as to include both a label and a substrate it is attached to—in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Once a digital fingerprint of an object is acquired, a characterization of the object and corresponding fingerprint may be recorded in a database. For example, in some embodiments, a fingerprint may comprise one or more feature vectors. In some applications, the database may be secure. In some embodiments, a unique identifier or ID may be assigned to an object, for example in cases where an ID may be a convenient index in an application. However, an ID is not required since a digital fingerprint itself may serve as a key for searching a database. In other words, by identifying an object by the unique features and characteristics of the object itself, arbitrary identifiers, labels, tags, etc. are rendered unnecessary.

FIG. 1A is a simplified flow diagram illustrating a method 100 for creating and registering a digital fingerprint of an object in a database. The process, in one embodiment, includes acquiring a digital image data of the object, at block 102, as described above. A variety of scanning technologies and devices may be used as previously noted. Next, features are extracted, at block 104, from the digital image data. As above, specific features or regions of interest (authentication regions) may be selected in anticipation of subsequent identification or authentication attempts of an object. The extracted features are analyzed and feature vectors are extracted to form a digital fingerprint, indicated at block 106. The digital fingerprint may be stored in a database record 108. Other forms of searchable digital data storage should be deemed equivalents. Further, at block 110, initialization data may be added to the database record or associated with it in a related table. This data may be associated with the physical object that was scanned. This data may be, for example, a description, manufacturer, model number, serial number, contents, or any other data deemed appropriate or useful for the object or a class of objects.

Figure 1B:
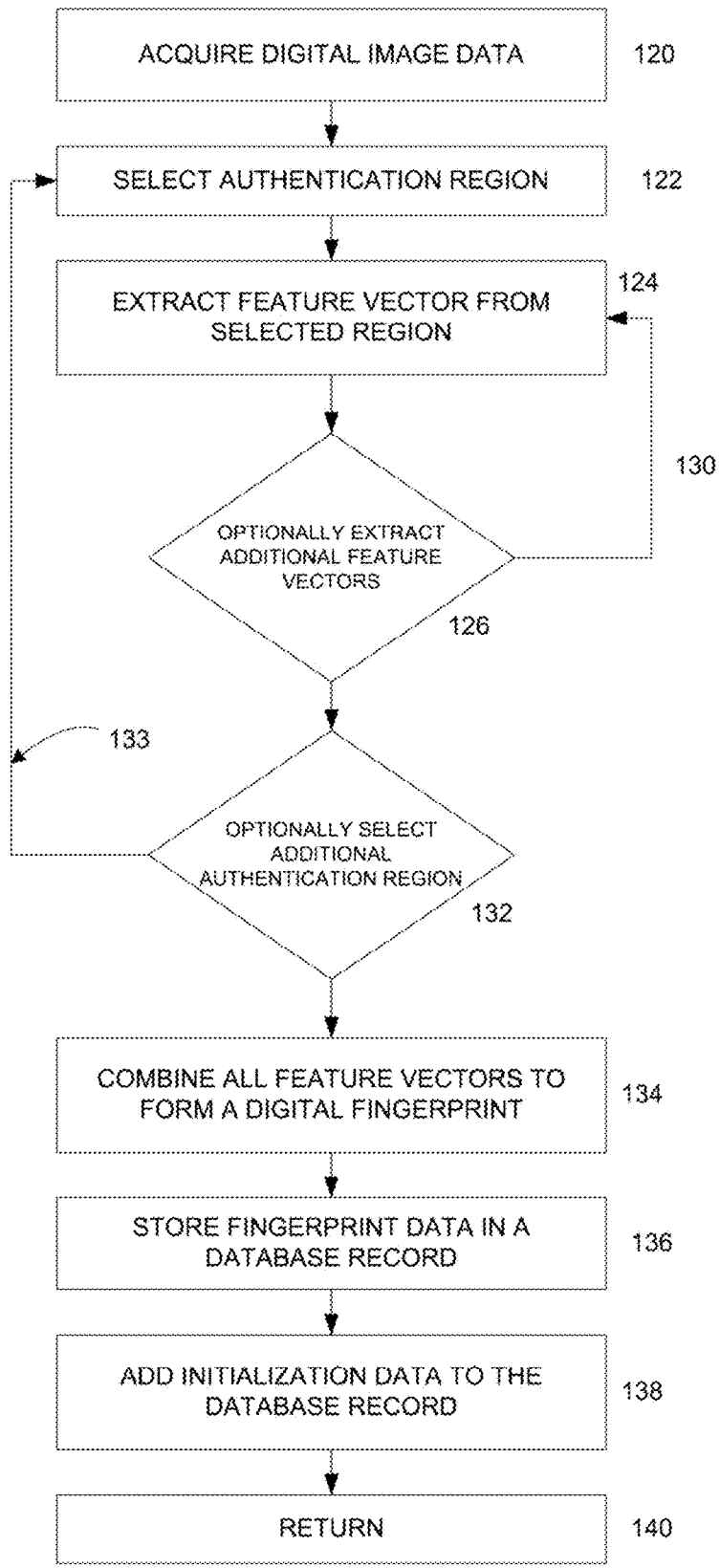
FIG. 1B illustrates an example of an alternative process for feature extraction.

FIG. 1B illustrates an example of a process that includes more robust feature extraction. In one embodiment, the process similarly begins with acquiring digital image data, at block 120. At least one authentication region is selected, at block 122. This may be done by analysis of the image data, analysis of related image data, by reference to a predetermined template that defines at least one authentication region, or other means. The next block 124 calls for extracting a feature vector from a selected authentication region. A feature vector may be used to represent features of a region in a more compact form. In some examples, a feature vector may comprise an array of color or gray scale numeric values corresponding to areas within the selected authentication region. The values may each comprise a sum, average, maximum, or other function of the individual values of a corresponding group of pixels forming a sub-part of the region. In some embodiments, a feature vector may identify a location and shape of a distinctive aspect within a selected region. In decision 126, there may be additional feature vectors to be extracted from the same image data. In that case, the flow returns, path 130, to repeat the feature extraction block 124. The loop comprising block 124, path 130, and decision 126 may repeat until all desired feature vectors are collected. Optionally, there may be another authentication region to process in the same image data, see decision 132. In that case, path 133 is traversed back to block 122 for further feature extraction with respect to one or more additional authentication region. Then some, or all of the extracted feature vectors may be combined to form a digital fingerprint, block 134, which is then stored in a database record, block 136, along with related data, block 138, as mentioned above. The process returns or concludes at block 140.

A database of digital fingerprints may form the basis of a system to identify or to track-and-trace an object in a supply chain, distribution network, sales channel, or any other series of locations, ownerships, or possessions. An identification system based on digital fingerprinting has unique advantages and capabilities that are not available with identification systems based on currently available methods.

Current identifiers such as holograms, bar codes, and serial numbers may all be duplicated (or otherwise counterfeited) with varying degrees of effort. Because such identifiers are vulnerable to diversion and counterfeiting, a counterfeit object with a duplicated identifier—and counterfeit objects with otherwise counterfeited identifiers—may enter a supply chain or distribution network. The counterfeit identifiers may subsequently be registered in a conventional identification or track-and-trace system. All current identification systems rely on determining whether the identifier (label, hologram, RFID tag) is legitimate, not whether the object itself is legitimate.

Due to this weakness, identification and tracking systems based on conventional approaches like bar codes or serial numbers cannot prevent counterfeit objects from entering a supply chain or prevent the resulting corruption of the system database. A counterfeit object may be mistakenly identified as genuine, and generate a false audit trail as it is identified through the supply chain. Two or more objects with the same ID (one genuine, one or more counterfeit) may exist at the same time without detection. Without physically examining the objects it is impossible to tell which object is genuine and, depending on the quality and origin of the counterfeits, even physical examination of an object may be insufficient to determine its authenticity.

Once a counterfeit object has been detected in a conventional system, false audit trails must be removed from the system database to restore integrity. This may be difficult depending on the structure of the database and the complexity of the identification data. In some cases the objects may not have any further contact with a system (for instance if they are purchased by a consumer), and the record will never be identified as false, leaving the database permanently corrupted.

In some embodiments of the present disclosure, an object may be scanned and identified at initial manufacture. Alternatively, an object may be scanned and identified at any subsequent time or location for entry into a database. Preferably, the scanning and identification is carried out when an object is either in the possession of its manufacturer or has been transferred by secure means to the point of scanning so that its legitimacy at the point of identification may be adequately established. However, this is not necessary and the adequate legitimacy of an object may be established through various other means.

Figure 2:
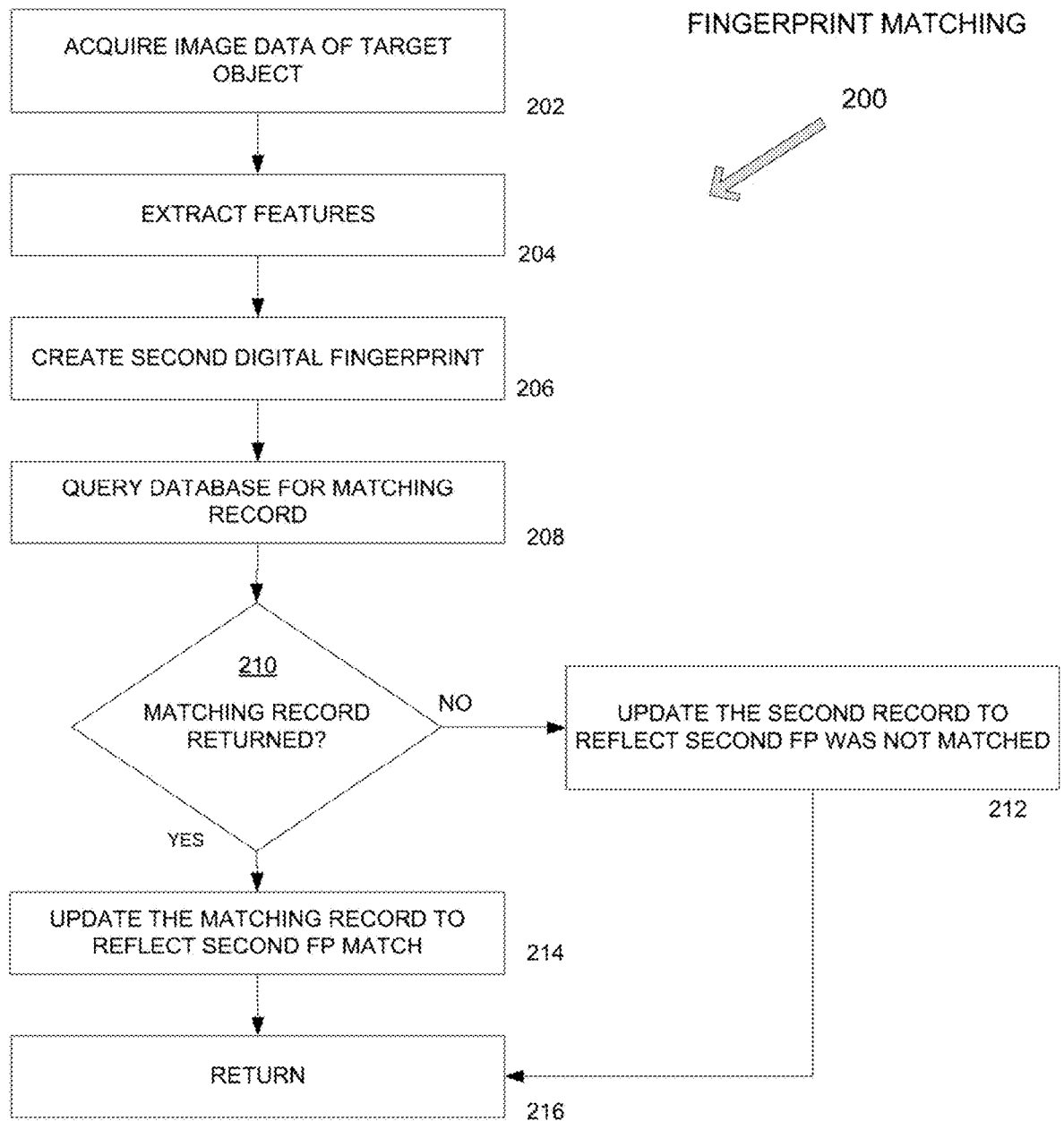
FIG. 2 is a simplified flow diagram illustrating a method for matching a digital fingerprint of a target object to a database of existing digital fingerprints.

In an embodiment, the system subsequently identifies the scanned and identified object every time the object is scanned again, typically at discrete steps in manufacturing, distribution, and sale. FIG. 2 is a simplified flow diagram illustrating a method 200 for matching a digital fingerprint of a target object to a database of existing digital fingerprints. Block 202 shows acquisition of the image data of a "target object" i.e., the object sought to be identified or authenticated by returning a match in the database. Features are extracted from the target object image data at block 204, as discussed above. A new (second) digital fingerprint record is created based on the extracted features at block 206. The next step is querying the database, block 208, for a record that matches the second digital fingerprint record. "Matching" in this context may reflect a threshold confidence level rather than a binary decision. The requisite confidence level may vary depending on the specific application. The confidence level required may be varied dynamically responsive to the data and experience with a given system. If no "matching" record is returned, decision 210, the second digital fingerprint record (the digital fingerprint ("FP") of the target object), block 212, is updated to reflect that no match was returned. If a match is returned, the matching record is updated to reflect the match 214, for example, it may be linked to the second record. The results may be returned to the user 216.

Figure 3:
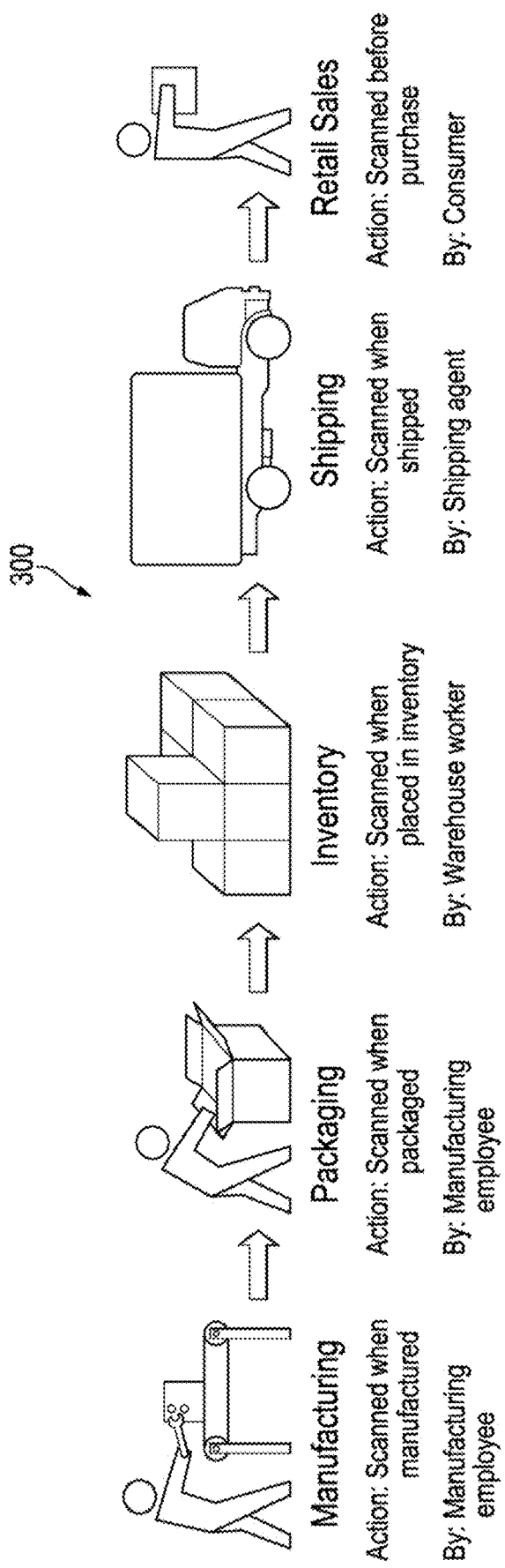
FIG. 3 is a simplified conceptual diagram showing a method for scanning of an object at various times and places along a manufacture and distribution chain.

Examples of scanning locations might include scanning at the point of manufacture, when packaged, when placed in inventory, when shipped, and at a retail point of sale (e.g. upon arrival and again when sold), as illustrated in the tracking process 300 of FIG. 3. Each scan may be used to update a remote database.

As previously described, a "scan" may refer to an image (or to digital data that defines an image) captured by a broad range of capturing devices. In an embodiment, a scan of an object may capture both features of the object and features of an identifier that has been attached to the object. Feature vectors extracted from authentication regions located on an attached identifier are based on the substances of which the identifier is physically comprised rather than the information (typically alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the creation and use of a feature vector than a set of randomly printed lines and numbers.

Figure 4:
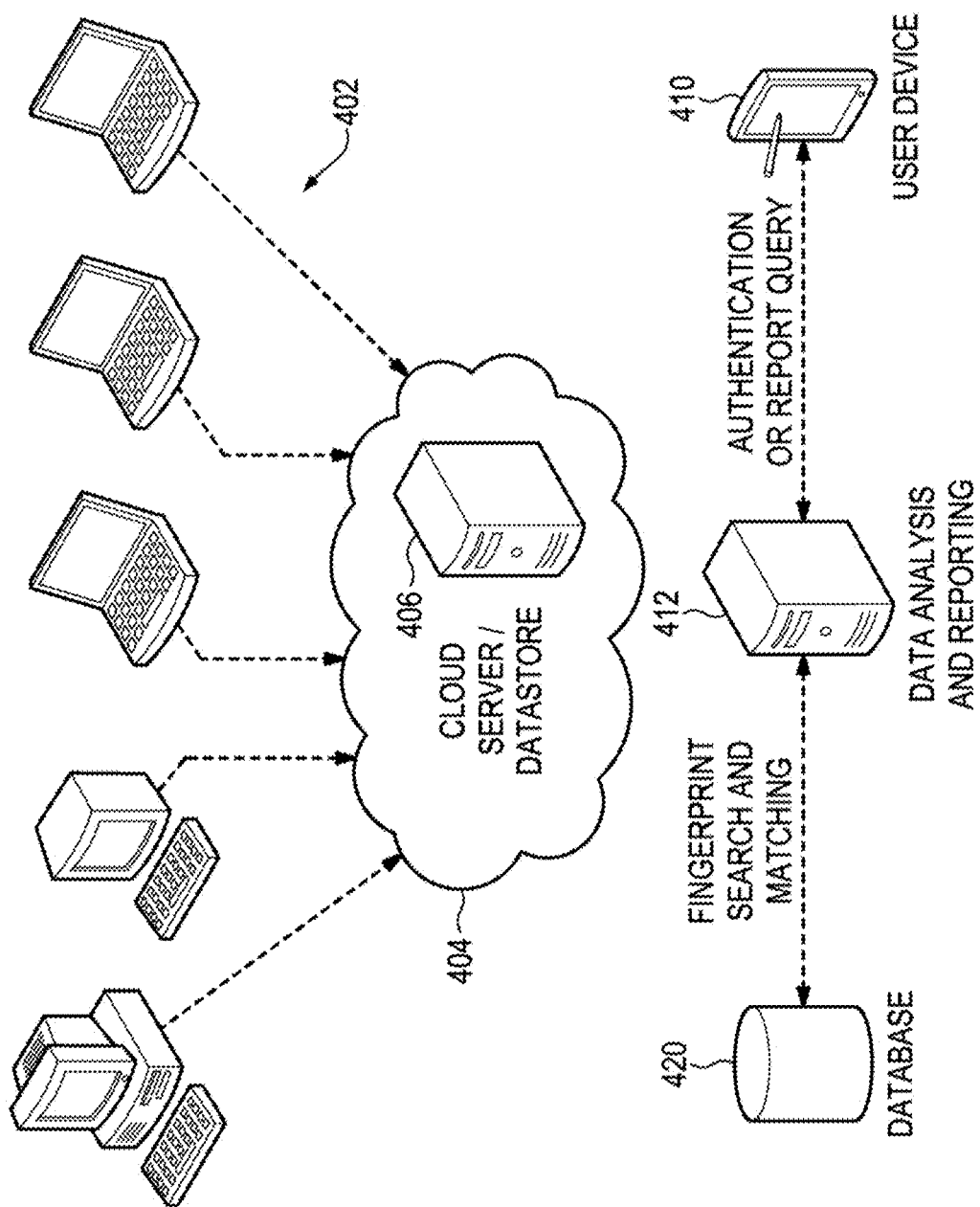
FIG. 4 is a simplified conceptual diagram illustrating an example of the use of a mobile device application to query authentication information related to an object.

FIG. 4 is a simplified conceptual diagram illustrating an example of the use of a mobile device application to query authentication information related to an object. Here, various computing devices or terminals 402 may have access over a network, for example, the internet 404, to cloud computing facilities or services such as a cloud server or other datastore 406. For example, devices 402 may be located at various points along a distribution chain as illustrated in FIG. 3, each location scanning an object and updating a cloud server or other datastore 406.

A server 412 may be provisioned to provide identification and/or tracking data analysis and reporting. The server 412 has access to a database 420 which may be used to store digital fingerprints and related data. The server can query or search the database 420 for digital fingerprint search and matching. The database 420 is preferably coupled to the cloud server 406 in some embodiments. A mobile user device 410 such as a smartphone, tablet, laptop computer, or dedicated device may be configured for communications with the server 412 to request and receive a reply or authentication report for an object of interest. This architecture is simplified and in any event is merely illustrative and not intended to be limiting.

In some embodiments, sensors may be attached to the object, and sensor data can flow back to the database in either a continuous fashion (near real time), or in discrete data transfer events. For example, data transfer may occur when an authentication event occurs. For instance, if there is a GPS chip attached to the object, data flow can start when the object is first registered in the system, and continue to flow as the object changes location. Continuous or intermittent data updates may also be buffered in local memory in a sensor attached to an object, and then downloaded the next time the object is scanned and authenticated. This example provides an itinerary record of where the object has traveled.

As an example of the potential uses of sensor data, many products like food and beverages can degrade with exposure to certain environmental factors during storage and shipment. Examples of sensor data could include temperature, humidity, light exposure, altitude, oxygen level, or other factors, as well as location such as GPS data.

Figure 5:
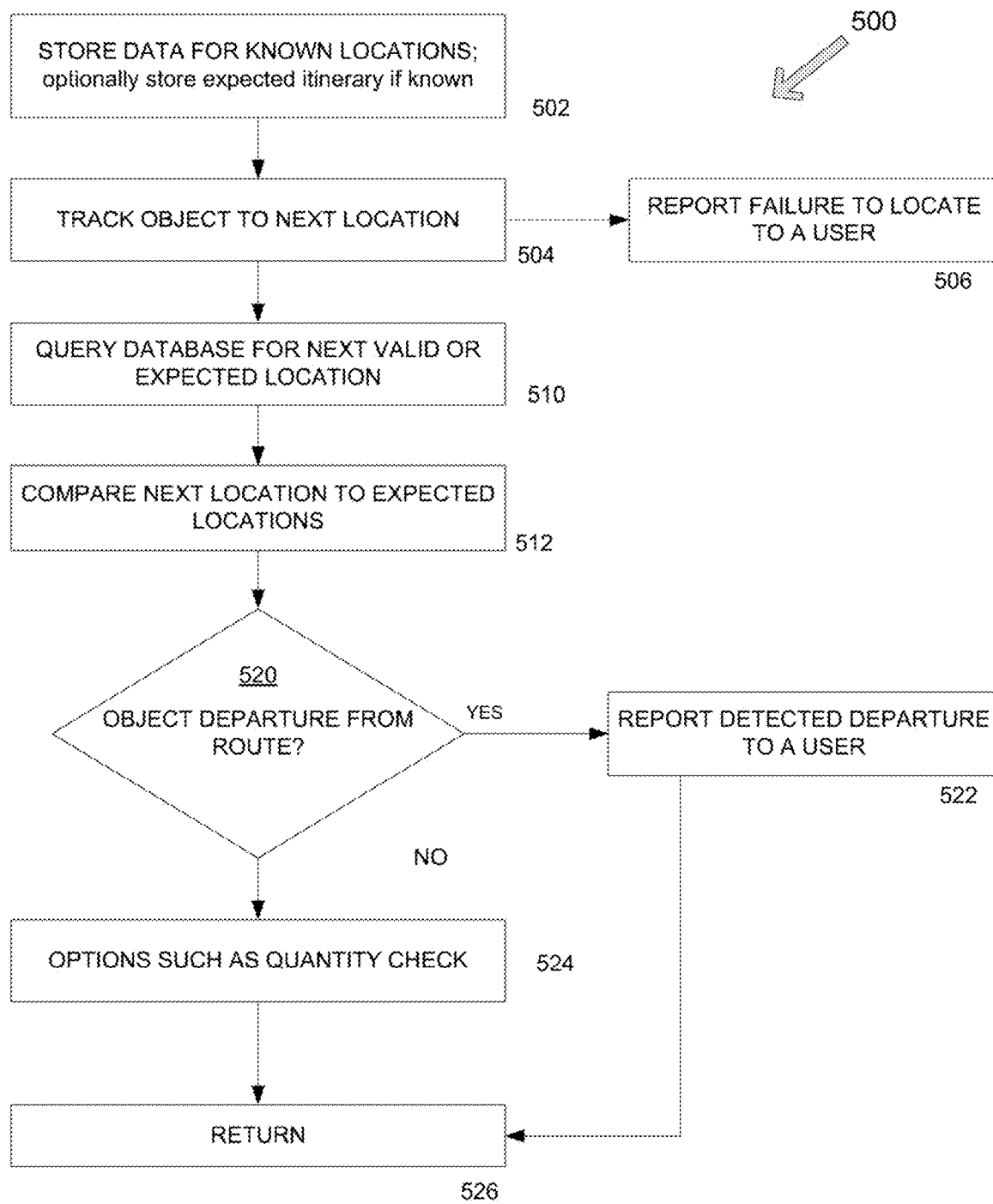
FIG. 5 is a simplified flow diagram illustrating a method for tracking an object to verify its provenance.

FIG. 5 is a simplified flow diagram illustrating one embodiment of a process 500 for identifying an object to verify its provenance. Here, an expected itinerary of an object (a series of locations) may be stored in a datastore if known, block 502. The methods and systems described above may be used to track the object to the next location, block 504. If the object does not arrive as expected (where and when expected according to the itinerary), the failure may be reported to a user 506. In an embodiment, an object that arrives later than expected may be subjected to closer matching scrutiny to ensure its identity.

The next step, block 510, is to query the database for the next valid or expected location. A unique itinerary may not be known, but a set of valid or expected locations may be known. The next actual location of the object (as determined by imaging and matching digital fingerprints) may be compared to the expected location(s) returned by the database, block 512. If that comparison indicates a departure from the expected or authorized route, decision 520, the result may be reported to a user, block 522. (A report that the object is on track may be reported as well.) Other options may be implemented such as a quantity check, block 524. The process returns or terminates at block 526.

Most existing identification systems are designed only to be accessed by manufacturers or their authorized distributors, and some require specialized scanners or equipment. However, consumers also have a vested interest in determining whether the items they are buying are authentic. In some embodiments, the present system is designed to enable anyone along the supply, distribution, or sales chain, from manufacturer to the retail consumer, to access the system and determine whether the object is authentic. A specialized scanner is not required in all cases. For example, in one embodiment a mobile phone application designed for consumer use can be employed to scan an object, query the database, and determine if the object is authentic.

Finally, data collected by a digital fingerprinting system offers a variety of useful information to people along the supply, distribution, and sales chain. Reports can be generated on individual objects, or on sets of objects. These reports can include but are not limited to the locations of objects over time, audit trails, points of entry of counterfeit goods, and exposure to environmental variables over the course of an object's lifetime.

Tags and Bar Codes

In some instances, an identifier such as a tag or a label may be considered a useful addition to an object, mainly for two reasons. The first main reason is that a human may need to reference it for information. For example, a tag or a label may inform a store clerk as to the particular style and size of a piece of clothing by a particular manufacturer, or it may tell a postal carrier the address to which a mail piece should be delivered. The second main reason has to do with the employment of machine-readable tags, for example when an Intelligent Mail Barcode on a mail piece (unreadable by humans) is used to route the mail piece by machine. The entire class of existing machine-readable tags can be replaced by the methods of the present disclosure. In some instances, tags or labels may still be needed for human information but they are unnecessary for the purpose of authentication or any machine-readability functions.

Because digital fingerprinting exploits natural features and often involves scanning an object under variable conditions, it is highly unlikely that two different scans will produce the exact same fingerprint. As a result, an ability to look up objects in the database when there is a near-miss is included. In one example, two feature vectors [0, 1, 5, 5, 6, 8] and [0, 1, 6, 5, 6, 8] are not identical but, given a certain difference metric, they may be close enough to say with a level of certainty that they are from a certain object that has been scanned before. This is particularly true if, otherwise, the nearest feature vector of a different object is, for example, [5, 2, 5, 8, 6, 4]. For example, a distance between vectors of n-dimensions may be calculated and used as one metric of similarity or "closeness of match" between two or more vectors. The distance to the next nearest candidate may also be considered.

Global Vs. Regional Feature Matching

In some embodiments, where we have an original document or other object fingerprinted, the digital fingerprinting techniques allow region-by-region matching, making it apparent which (if any) regions have changed from the original. Thus, for example, a good overall match on a passport may be achieved but if none of the matches happen in the photograph it becomes apparent that the photograph has likely been changed. Further, if some individual or group, say Al Qaeda, has a certain pattern or regularity to altering passports—such as to change the photo, the date of birth, and one digit of the passport number—then this ability to find altered regions may also provide the ability to discern a pattern of changes that may be used to identify a "signature" modus operandi of a particular counterfeiter. Thus aspects of digital fingerprinting may be applied not only to detect a forged or altered object, but may also be used to identify a counterfeiter or otherwise discover the source of an altered object.

Authentication Used to Trigger Other Actions

We have further discovered that authentication of one or more physical items (through various means mentioned herein) can be used advantageously to trigger actions or processes related to the authenticated item(s) or to other items automatically, i.e., without additional intervention. One simple example was mentioned above in the context of a supply chain. Conversely, one or more failures of authentication may be used to trigger actions on either the item that failed authentication, or on other items. More generally, any combination of authentication results can be used to select one or more consequential actions or processes. In other words, 1) there can be one or more items on which authentication is attempted; 2) there can be one or more items on which the triggered processes operate; 3) those two sets can be the same, disjoint, or overlapping; and 4) different actions may be triggered based on which of those authentication attempts were successful and which were not. In some cases, the individual authentication results may be binary (authentic or not). In such cases, a Boolean combination of results may be convenient to select the resulting action. But the results need not be binary. Indeed, often they may be expressed as a probability or confidence level.

In some examples, a triggered action or process(es) may be computer-implemented, for example, using executable scripts. The scripts may be executable on the same system where authentication is effected, or on a separate system. Participating systems may be communicatively coupled, for example, over a network. A packet-switched data network is one example, other networks such as a data channel or service of a voice network may be used. The particular communication mode or protocol is not critical. It may be immediate ("real time"), or delayed, deferred, or batch mode, etc. It may be wired or wireless. What is important is that at least one additional action or process is triggered or initiated, locally or remotely, by an affirmative authentication result. There may be no networking or special communications involved in use cases where the additional or "contingent process" is carried out by the same machine that conducted the authentication.

In one example, methods and systems are disclosed to realize a combination of purchase and authentication of an item into a single action. The term "item" here is used in its broadest sense; it includes all manner of physical objects. Put another way, in this particular example, a purchase is the action or process contingent on an affirmative authentication result.

One goal of some embodiments is to make the purchase process as fast as possible. In this way this proposal resembles Amazon's "One-click®" online shopping system. It differs from one-click, however, in several important ways. First, one-click is essentially a method of making purchases using previously stored purchasing data (shipping address, payment method, etc.) Besides catalog information, nothing about the authenticity of the item is asserted or produced during the one-click process. In some embodiments of present disclosure, a selected item is both purchased and authenticated by a single action. In some embodiments, the action or "click" is the act of imaging the article for authentication and purchase. An example of that process is detailed below. However, the triggered actions or processes described herein are in no way limited to completing a sale transaction; that use case is merely an example for illustration of the broader inventive concept.

In the purchase context, embodiments may be used to ensure purchase of a genuine article by introducing authentication into the purchase process in such a way that it not only does not slow down the process, but rather speeds it up. In our previous patents we have pointed out that the item being authenticated "speaks for itself," meaning that nothing need be added to carry along the authenticity of the product from producer to purchaser. In other words, no special stickers, tags, labels, holograms, or any other features need be added to the item for the purpose of authentication. Here that concept is extended. The item, because of previous associations described below, also carries along the ability of the purchaser to make the purchase as an integral part of the authentication process—or to authenticate as an integral part of the purchase process.

Other examples are listed below. In some cases, a script may be prepared in advance to implement the conditional logic ("if the object is authenticated then do the following things. If it is NOT authenticated, then do the following other things.") As noted above, combinations of authentication results from multiple objects may be used to select a triggered process. Scripting is just one example of using processor executable code to conditionally implement the triggered process.

A. A repair person on an aircraft has a part that needs to be replaced. He has before him the new part. Using a mobile device he images a portion of the part. The authentication system may be contacted using the mobile device. If the part is authenticated as genuine (based on the captured image or data derived from the captured image), the manual for installing the part automatically comes up on his screen. If it fails authentication, he may instead receive a warning alert; and the aircraft owner's purchasing department and legal department may be notified.

B. A manufacturing component arrives at the loading dock. A worker images the item, it is "fingerprinted"—a shorthand phrase meaning image data is captured and processed as described above. If it is authenticated, it is entered into the inventory management system and the worker is told what bin to place the item in. If it is not authenticated then some kind of exception process is triggered.

C. There need not be symmetry in the triggering. That is, there may be a script to be executed if it IS authenticated but not one if it is NOT. Or the other way around. In some cases, there may be different scripts depending on whether authentication was successful.

D. Devices of various kinds may be used for authentication. There are at least three functional aspects of an authentication system, namely—(1) raw data (image) capture, (2) image data processing to characterize the image data, and (3) comparing the characterizations with previously-extracted characterizations stored in a database of known authentic items. At a minimum, raw data capture generally requires (a) some kind of input component, which may be a scanner, camera, CCD, etc. capable of capturing an image (not necessarily visible to the naked eye), and (b) a means to deliver, export, or communicate the raw image data for characterization processing. In some examples, a processor to carry out the characterization processing may be in the same device as the image capture component. In such cases, the processor may access the raw image data via an internal network, shared memory, or other known means; smartphones are one example.

In other cases, the raw data may be exported via communications over an external network or the like to a different device to carry out the characterization processing. The external network may be wired or wireless; the communications may be real-time or batched. Manual communications (aka sneaker-net) may be used as well; where the raw data is stored in a portable memory device (for example, an SD card, CompactFlash (CF) or the like) for transportation to another device or system. Regardless of whether local or remote from the image capture component, a processor processes the raw image data to form the characterizations. The characterization may be expressed and stored as digital fingerprints. Finally, the third function calls for comparing the characterizations with previously-extracted characterizations stored in a database as noted above. Typically, the comparison may be carried out by a database system. The database system may be arranged to receive a query that comprises the characterizations data, and potentially other parameters, and return a result, which we call an authentication result. The result(s) may take various forms, including a simple binary value (match or no match), or information that includes a confidence level or probability of a match. Preferably, the datastore is secure, and will not export the stored data except to an authorized, authenticated user.

In some embodiments, the image capture, data processing and database functions may all be provisioned in a single system. In other cases, a mobile device may provide the data capture, processing, and communications to enable utilizing a remote database system. A stand-alone database service, which includes (or is coupled to) a database, may be arranged to provide authentication services to various users, for example, over a network. Various arrangements may be used; these are merely examples for illustration.

Some illustrative devices may include but are not limited to the following examples:
  i. A static or conveyor device transporting the object past an authentication system;
  ii. A handheld device;
  iii. A direct neural link;
  iv. An augmented or virtual reality device;
  v. An optical head-mounted display, for example, designed in the shape of a pair of eyeglasses. Such a device may include a still or video data capture component mounted on the glasses. In one use case, a user may see a set of items such as etchings in an art shop, see the authentication tags on them, and blink at one to purchase it. In more detail, the glasses capture image data of the tag in view, process the data, and communicate with a remote server. At the remote server, the characteristics (for example, fingerprints) are recognized by database query, and the recognition (authentication) triggers the purchase process.

In some embodiments, a system may be configured to, using fingerprinting, track an object by first importing corresponding data for the object, and then issuing a notification or alert when the same object is recognized later. In other words, when it later "authenticates" (in this case recognizes the object as one for which it has instructions) the object, trigger the notification process. This could apply to something I own (that I am inducting for insurance purposes so I can later identify the item) or to something I see (a strange car in front of my house).

An Illustrative Process

Purchasers want to be sure (or at least highly confident) of the provenance of the items they are purchasing, especially for items that are relatively expensive, or where for other reasons provenance is important. This process allows the purchaser to avoid the inadvertent purchase of non-genuine items, for example, counterfeit items. The system can also be used to identify and help to recover stolen (genuine) items. In the case where an image is processed, and the database queried, it may return a result that the item is stolen. In an embodiment, the authentication finds a match in the database, but the corresponding record may have a flag that indicates the item is stolen. This query result may trigger a predetermined process, say to alert the buyer, the seller, or a law enforcement agency associated to the stolen item in the database. A process of this nature might be used, for example, at a pawn shop, where a customer (borrower) presents an item for collateral to secure a loan. The processes described herein may be used to scan the item and instantly query a local police department database (or a broader database) of stolen goods. To support this function, the owner or other authorized user would have to notify authorities to update the corresponding database records when an item is stolen or otherwise "turns up missing."

Returning to the typical purchase scenario, there are many approaches known to establish or reestablish the authenticity of an object, including secure supply chains, expert assessment, and counterfeit detection. Similarly, there are many ways in which a purchaser may choose to buy an item. Amazon's "one-click" (online purchase) and the simple act of taking the item to the checkout counter ("brick and mortar" scenario) are just two examples. What is lacking, however, and is provided by the current disclosure, is the ability to combine the two processes—authentication and purchase—into a single process.

Although the illustrative process discussed here may center on the use of a smartphone or other imaging device, any method may be used to capture "fingerprint" data of the item to be authenticated and purchased. Fingerprint data is information extracted from the object (whether optically or by other means) that characterizes at least a part of the object so that when a fingerprint from the object is compared with fingerprints in a reference database, a sufficiently close match is indicative that the test object and the reference object from which the reference fingerprint came are the same object. We use the singular for simplicity of illustration, but more than one capture device can be used to capture image data of an item of interest. Further, in the case of multiple capture devices, they may or may not utilize the same technologies. For example, the capture devices may capture data at different frequencies of the electromagnetic spectrum. Similarly, when we speak of the process carrying the "authentication" or "proof of provenance" of an item into the purchase process, it should be understood that we also mean carrying "second provenance"—i.e., previous authentication by an expert, for example—along as well.

While the description of the summary process speaks of purchases made in an art gallery, wine store, accessory store, or other physical location, authenticated purchases can take place under any circumstance where completion of the transaction both depends on and is triggered by the would-be purchaser ascertaining that the item is genuine. In another example, below, the purchase may be initiated online, but completed upon authentication of the item at the point of delivery to the purchaser. In other cases, authentication of one or more items other than the one for sale may be used to enable the sale or execute any other action or process.

In a preferred embodiment, several things must be in place before the process envisioned in this disclosure begins:

A seller must have a specific item for sale that the customer wants to buy.

The sale must be contingent on the customer being assured of the item's authenticity.

The item's fingerprints must have been entered into a valid "authentic item database" that is accessible to the customer and not controllable by the seller.

The customer's payment method must be made available to the seller as part of this process. This payment method information could already be in the possession of an authentication service, in a digital wallet, or maintained by the seller.

The item must be effectively in the purchaser's hands or accessible (e.g. in a store or the hands of a courier or other bailee.

Figure 7:
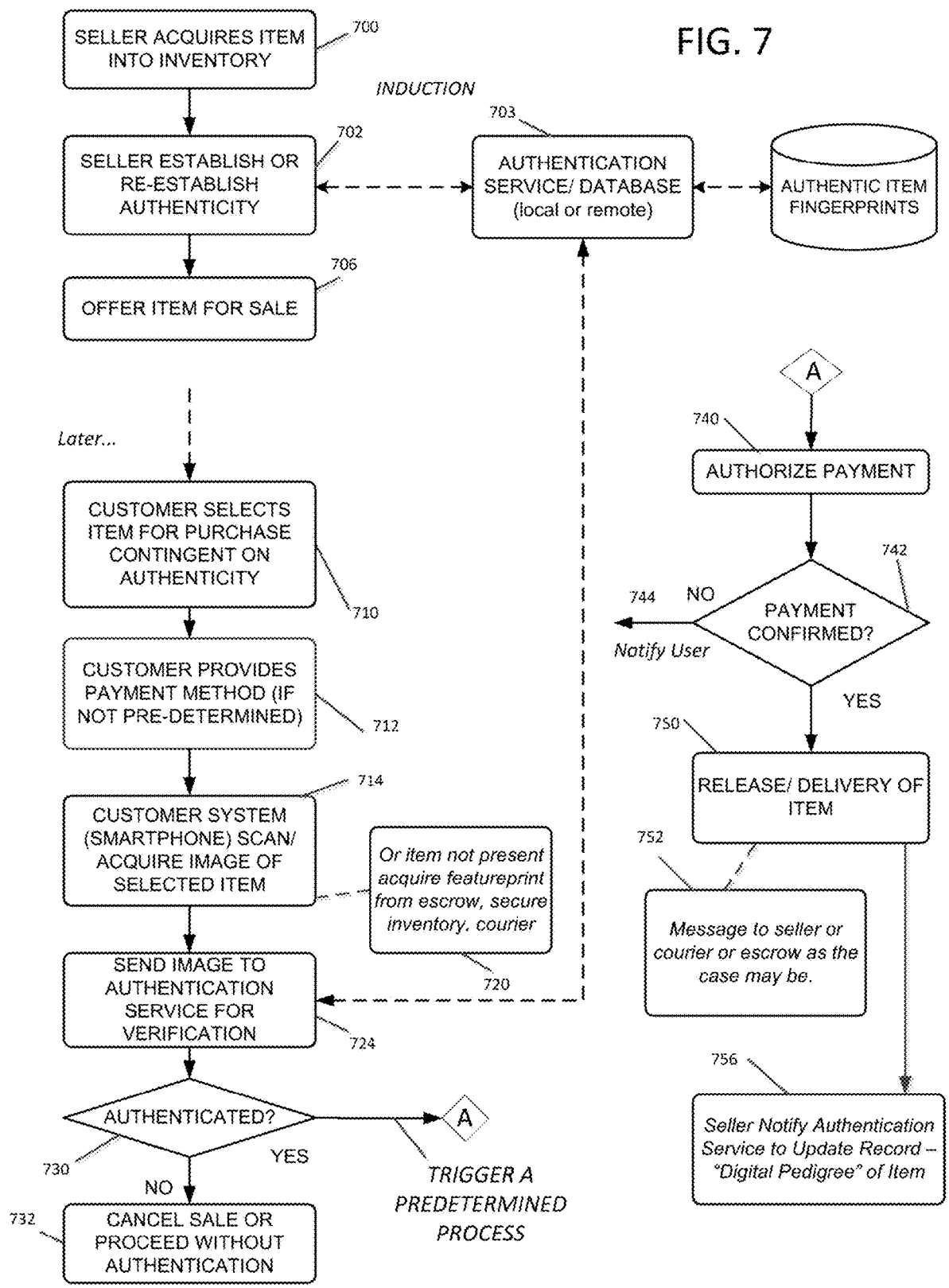
FIG. 7 is a conceptual system and flow diagram illustrating a method for using authentication of a physical object to automatically trigger actions or processes related to the authenticated object.

The disclosed innovation in one embodiment teaches the following process, illustrated in FIG. 7. FIG. 7 is a simplified system and flow diagram illustrating a method for using authentication of a physical item to automatically trigger actions or processes related to the authenticated item. A seller first acquires an item into inventory, block 700. The seller then establishes or re-establishes authenticity of the item, block 702. In some embodiments, a device or application may communicate with a remote or local authentication service 703 for that purpose. The authentication service (typically provisioned on a server) has access to a database 705 of item fingerprints. It is anticipated that a database of authentic items exists and that that database is typically outside the control of the seller (e.g. it may be under control of a third-party authentication service provider). This might, for example, include wine that was "inducted" when it was bottled (fingerprints created and securely stored), prior to transport to the intermediary who is the "seller" in this case and offers the item for sale 706. In some cases, the seller may induct items into the authentication system; see below with regard to FIG. 9B.

Referring to block 710, a customer of the seller selects an item for purchase, contingent on its authenticity. In some embodiments, the customer may provide a payment method, if it has not already been established, block 712. The customer captures an image (e.g. with a smartphone) or otherwise acquires image data from the item in question, block 714. In some cases, the item may not be present at the location of the seller. For example, the item may be too large, or it may be held in secure storage, or in the custody of a courier or other bailee, see block 720. The item may be at an unknown location when sale is initiated; for example, in the case of an on-line transaction.

The fingerprints of the item in the pending sale are compared with fingerprints from one or more known-authentic items (e.g. fingerprints extracted from the item when its provenance was known). Those authentic item fingerprints may be available for comparison in several ways. These include through a cloud-accessible database, but they also include encrypting the fingerprints of the item and printing a number or symbol representative of the encrypted fingerprints on the item or on some tag securely affixed to the item. In the drawing FIG. 7, for example, the purchaser (using a mobile device) may send the captured image to the authentication service 703 to authenticate the item 724. Note, the purchaser need not necessarily contact the same service 703 as that used by the seller, but the service utilized must have access to the database 705 where the item fingerprints were previously stored.

If the item is not authenticated, decision 730, the sale may be canceled, or the purchaser might elect to proceed without authentication, block 732. The sale might proceed at a discounted price in the absence of authentication. The conditions under which a sale or other action dependent on one or more authentication actions (successful or otherwise) would or would not take place may be established before authentication is attempted. If the item is authenticated, decision 730, the sale may proceed as follows. Payment may be authorized by the purchaser, block 740. If payment is not confirmed (for example a credit card purchase declined), the user (would be purchaser) as well as the seller may be notified, 744. If payment is confirmed, decision 742, the purchased item may be released or delivered to the purchaser as appropriate, block 750. In some cases, delivery may be authorized by sending a message to the custodian, block 752. The seller (or seller system) may then notify the authentication service 703 of the sale, to enable the service to update the corresponding database record(s), i.e., the "digital pedigree" of the item 756. The data may include a date stamp associated with the sale. It may include data about the purchaser.

There are at least two important benefits that the foregoing processes enable: First, a system can be configured using the techniques described so that the customer can only purchase an item that has been authenticated. Second, by wrapping authentication and purchase together, the process becomes automatic and very fast, with a minimum of extraneous actions.

Because of the previously-established system of payment, access to both the item and the funds are made accessible through the item authentication process. The item (and the app running on the customer's smartphone or internet connected mobile) thus becomes both self-authenticating and the key to functionally enabling transfer of both item and funds in one action. In some embodiments, a mobile device may not be needed. In some embodiments, the app need not belong to the customer. In some circumstances, a dedicated app may not be required.

The digital pedigree of an item (its provenance, of course, but also, for example, who has owned it previously) becomes linked to the item, thus increasing its value. It is in view of this disclosure to establish a digital pedigree, product and/or merchant review, and to make any and all such supplementary information accessible to the purchaser (along with the product itself). One way to look at this is that the "product" is the item plus all supplementary information. However, the database proprietor may exercise control over what information is released to whom using known methods such as permissions.

The item being part of such a process may materially increase its resale value as its purchase is more secure than any unauthenticated sale. In addition to authorization for access to the item and access to customer's funds being transferred from seller to customer and from customer to seller, respectively, additional information can be transferred and/or made accessible through this process. We mentioned pedigree but this could also include receipt for the transaction, transfer of certificates of authentication, access to user manuals, and many other things. Selective release of information can be one of the "triggered processes" based on authentication of one or more items as detailed below.

Figures 8A, 8B:
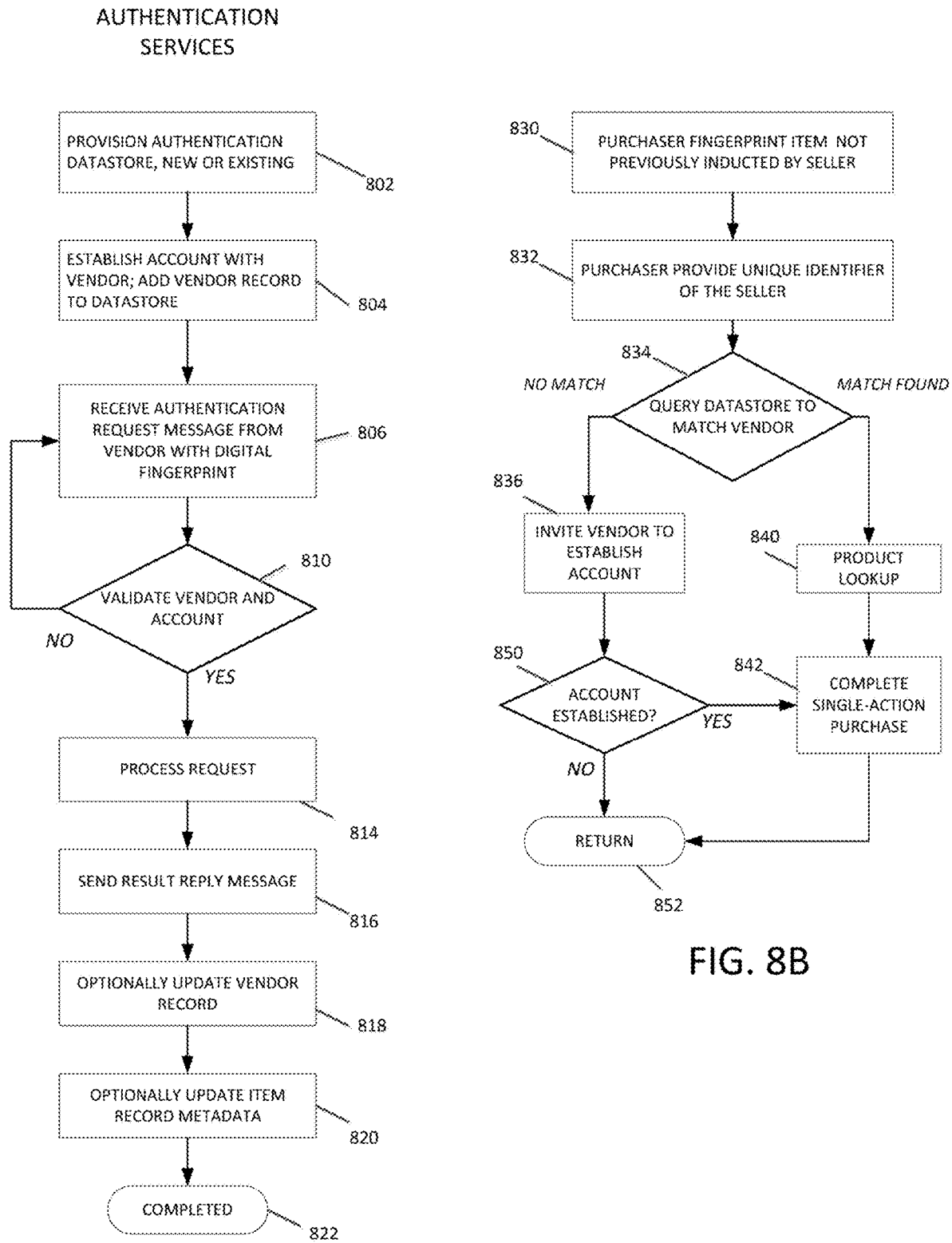
FIG. 8A is a simplified flow diagram illustrating an example of vendor account setup and interaction with an authentication service.
FIG. 8B is a simplified flow diagram illustrating an example of a process in which a purchaser seeks authentication of an object that may not have been previously inducted in the authentication service.

FIG. 8A is a simplified flow diagram illustrating some examples of vendor account setup and interaction with an authentication service. Here, an authentication service may provision a database for authentication data, or establish access to an existing datastore, block 802. The service may establish an account for a vendor, and store the vendor account information in a database, block 804. Some examples of useful data are given below. When the authentication service receives a request message from the vendor, block 806, it may check whether the request corresponds to a valid, active vendor account, decision 810. If so, the authentication service processes the request, block 814, querying the database based on the digital fingerprint provided with the request. The authentication service may then send a reply message based on a result of the query, block 816. Optionally, the authentication service may also update the vendor records, for example, with metadata describing the current transaction, block 818. It may also update the database record(s) associated with the item that matched the fingerprint, block 820. This process terminates at 822.

TABLE 1

Example User data (Purchaser & Seller) stored in a database.

Name
Shipping and billing address
Email, phone number, and other contact information
Credit card details/Bank details
Escrow or bailment account details
Transaction preferences
Transaction history
PIN
Information about the item itself:
Transaction history and pedigree
Associated item information (e.g. manuals)
What items are in the authentication system (i.e. this process cannot take place unless the item under consideration has previously been TABLE 1-continued Example User data (Purchaser & Seller) stored in a database.

entered into the system - presumably by the current or some previous owner)

Illustrative Transaction Types

This disclosure admits of multiple means of carrying out a transaction through the same fingerprinting process, including without limitation the following transaction types.

1. Direct Sale and Transfer of the Item

Here, a seller may have an account with a third-party authentication service provider (such as 703) and is in possession of an item previously inducted into the authentication system. A purchaser fingerprints an item that has been inducted by the seller which connects the item to the Seller's account. In one embodiment, an authentication service may query a database, based on the fingerprint submitted by the purchaser. A matching record will link the item to the seller. In another case, identification of the seller by the purchaser may be used in the authentication system to narrow the search which may reduce response time. After authentication by the purchaser, an acceptance gesture such as a swipe or click allows the user to make a one-action purchase.

Referring now to FIG. 8B, in another case, a seller may have an authentication account with an authentication service, but seller has not previously inducted the item of interest. Assume the purchaser fingerprints an item that has not been inducted by the seller, block 830. (We sometimes use "fingerprint" as a shorthand verb meaning "extract a fingerprint from," meaning capture image data and process the image data to extract one or more characterizations, and store them as a fingerprint.) The purchaser can then enter seller's account details (such as an email address or domain name) or scan/fingerprint an object or code that is unique to the seller's account, block 832. The authentication service may then query its records to find a matching vendor, decision 834. Once the connection is made, a product lookup (e.g. in an electronic catalog of seller products) can be presented, block 840, and provide the user with a one-action purchase, block 842. The service may send a reply message to the seller confirming the transaction. The process may continue via path 846 to optionally update the associated database records, blocks 818, 820.

Alternatively, the seller may not have an established account with the authentication service, so decision 834 results in no match. In that case, creation of a seller account may be initiated as follows. Purchaser fingerprints an item and then fingerprints or enters seller's details, as mentioned above. These actions may generate a notification (such as an email), block 836, inviting the seller to set up a fingerprints account to facilitate the purchase. The seller can then create an account, decision 850—YES; and set a price for the purchase. The purchaser is then presented with a one-action purchase, block 842. The process completes either way at 852.

2. Escrow

Figures 9A, 9B:
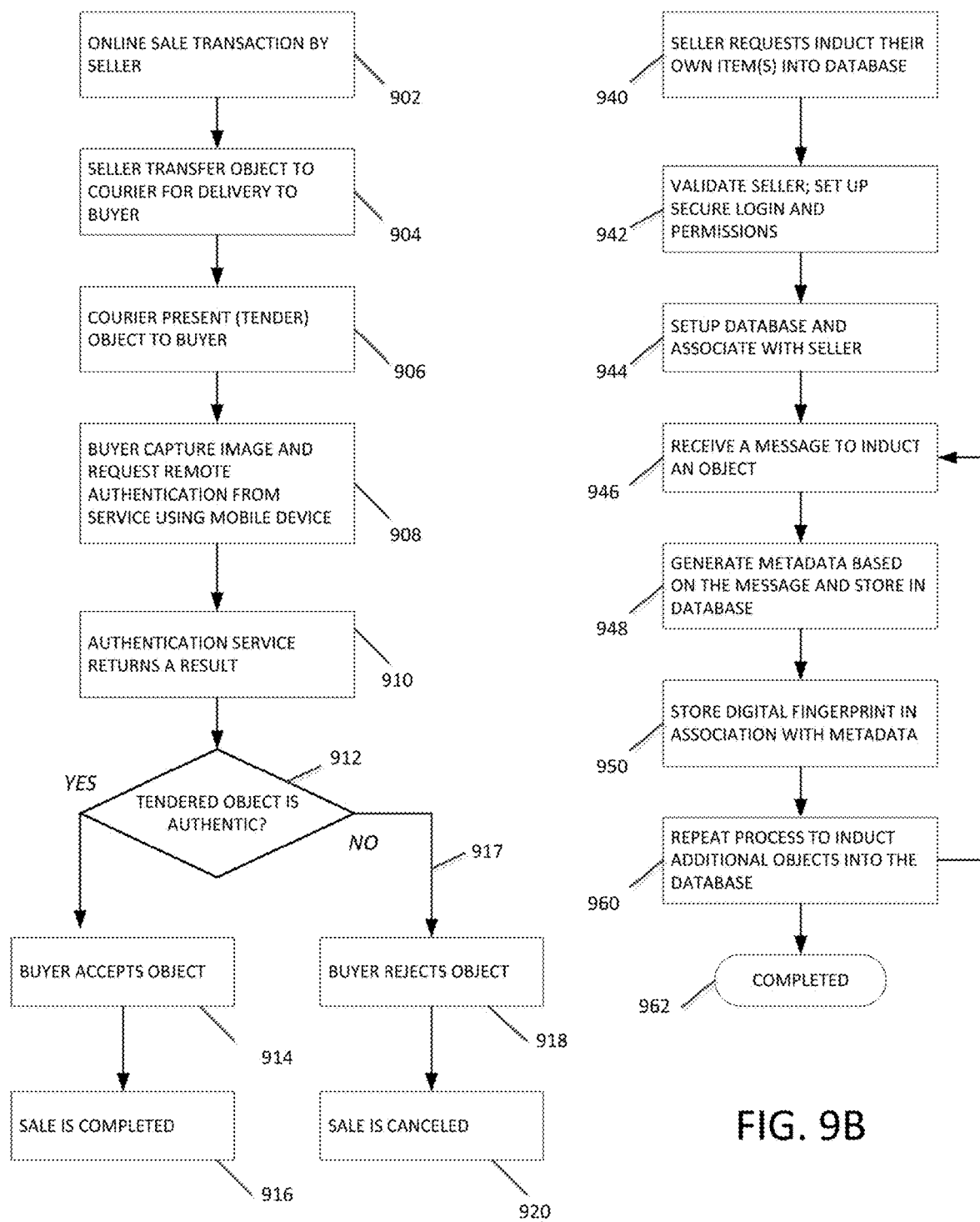
FIG. 9A is a simplified flow diagram illustrating a method for inspecting and authenticating an object at a delivery location before acceptance.
FIG. 9B is a simplified flow diagram illustrating a method for a seller to induct their own items into an authentication service database.

In some embodiments, a seller authenticates an item, and authentication by the purchaser releases escrowed funds from the purchaser to the seller, and releases the escrowed item from the seller to the Purchaser. For example, in a case of remote purchase for $3^{rd}$ party transport to the purchaser, a courier or delivery company may act as a proxy for the seller until the item is authenticated by the customer at point of delivery. Referring now to FIG. 9A, this approach enables items to be sold digitally (e.g. through an online service) but not transferred until physically authenticated—thus removing any dependence on the seller for confirmation of authenticity.

Thus, an online sale transaction occurs, block 902; and the seller transfers the object of the sale to a third-party transporter, courier, delivery company, etc., block 904. At the delivery destination location, the courier tenders the object to the buyer for inspection, block 906. The purchaser may authenticate the item using a mobile device, for example, as described above. The mobile device may execute an app that captures an image of a region of the item, processes the image to form a fingerprint, and contacts an authentication service to authenticate the item based on the fingerprint, see block 908. Here, the purchaser does not legally "accept" the item unless and until it is authenticated.

This is a type of "inspection" of the item, see Uniform Commercial Code (UCC) § 2-606. The authentication service returns a result (via a mobile app or text message or other medium), block 910. In some use cases, notifications (such as an email) may be sent to help a party (purchaser or seller) set up an account at an authentication service, and use it to facilitate a transaction between them. If the result confirms that the object is authentic, decision 912, the buyer presumably accepts the object, block 914, and the sale is completed, block 916. The courier may transmit a confirmation of delivery to the vendor. If the result indicates that the object is not authentic, branch 917, the buyer presumably rejects the tender, block 918, and the sale is canceled, block 920. This authentication-inspection at the point of delivery moots the chain of custody approach to authentication.

3. Shared Purchase

In some embodiments, two or more people can share in a joint purchase of an item by both of them fingerprinting it within some period of time. Or a purchaser may have the ability to invite someone not present to share in the purchase (all this may be part of any fingerprinting initiated or contingent purchase). Example: several siblings are buying their father an etching and pooling resources.

Class Purchase

An additional feature in view of this disclosure is the use of one item's fingerprint to facilitate a purchase of another instance of the same item type or class. Thus, for example, a customer has at home a bottle of his favorite wine that he bought from a vendor on a digital fingerprint authentication system. He fingerprints the label on the empty bottle with a suitable app (using any suitable digital device), and then sends a purchase request and delivery information to the merchant (along with the fingerprint or access to it). Contrary to say, sending in a regular photograph of the label, this process ensures with almost perfect confidence, quickly and easily, that another instance of exactly the same product is ordered.

Figure 10:
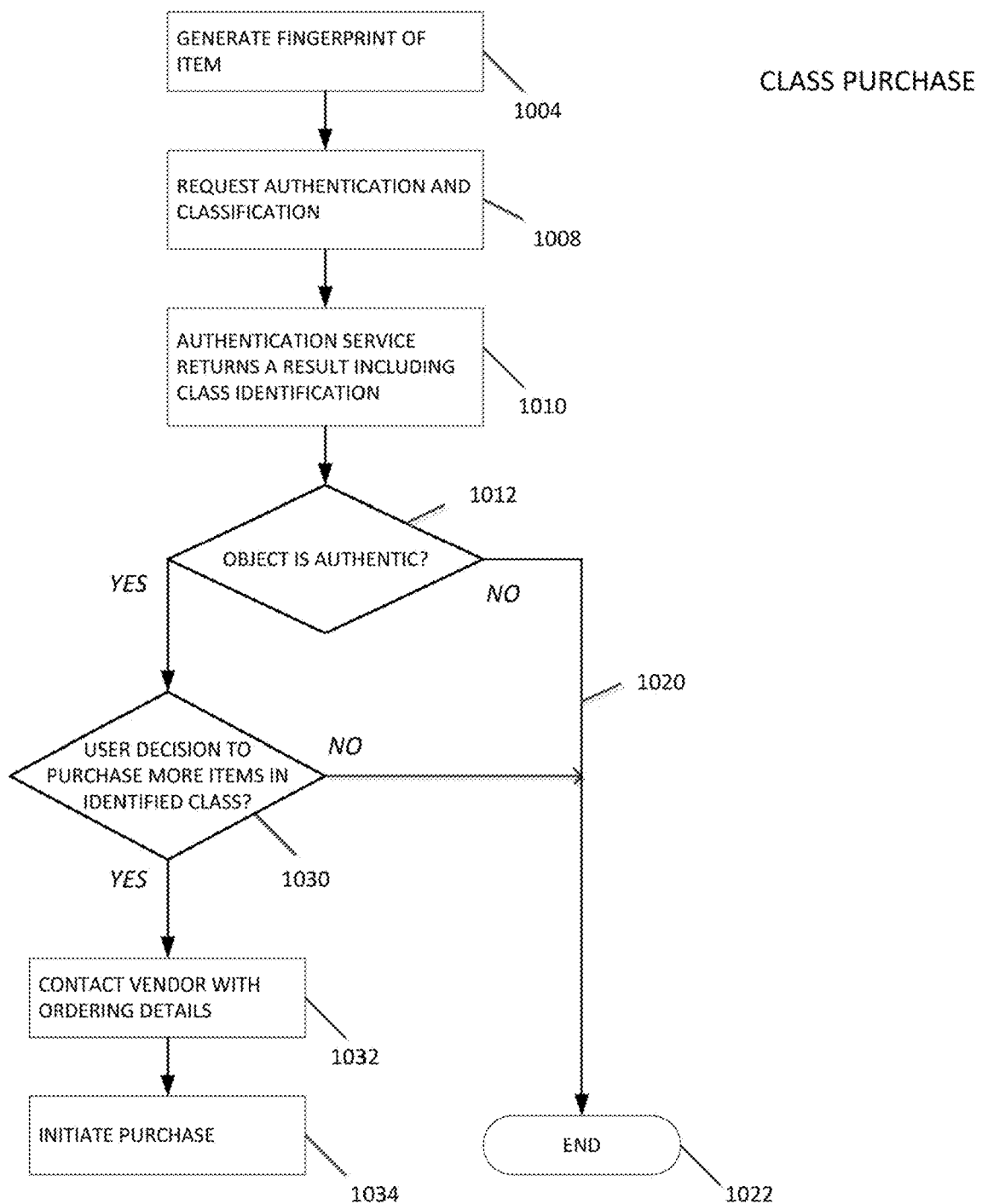
FIG. 10 is a simplified flow diagram illustrating an example of a class purchase consistent with the present disclosure.

An illustration of this type of process is shown in the simplified flow diagram of FIG. 10. In FIG. 10, a purchaser generates a fingerprint of an item of interest, block 1004, and sends it to an authentication service to request authentication and classification, block 1008. The authentication service queries an appropriate database, based on the fingerprint, and returns a result, block 1010. The result includes an identifier of a class of items to which the authenticated item belongs. As one example, the item is a bottle of wine, and the identified class is a particular lot of wine that includes the subject bottle. The item may be a truck brake pad, and the identified class may be a particular box of truck brake pads as shipped from the manufacturer.

Figure 11:
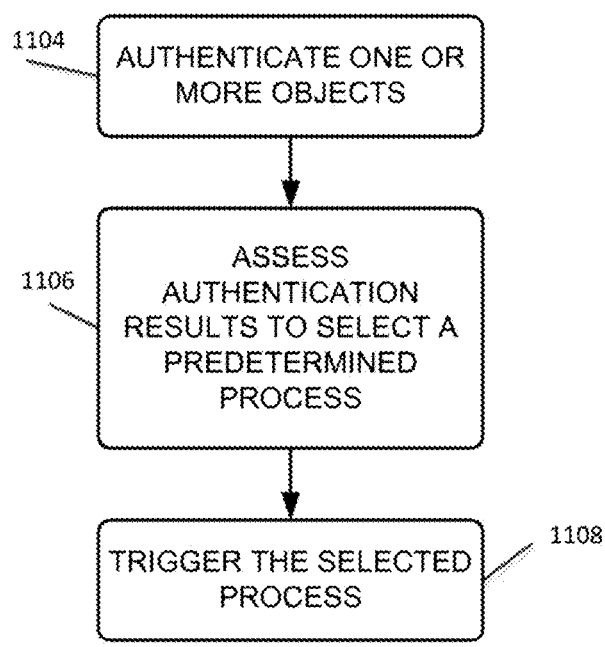
FIG. 11 is simplified flow diagram illustrating a method for using authentication of one or more objects to automatically trigger one or more selected processes based on the results of the authentication.

If the result indicates the item is authentic, decision 1012, the user may indicate (or she may have earlier indicated) a decision to purchase more items of the identified class 1030. Conversely, if the item is not authentic (or not authentic to a given confidence level), the transaction may terminate 1020 at 1022. If the user decides or had decided to purchase more of the item, the authentication process may trigger a process that automatically contacts a vendor with ordering details, in other words, it may place an order on behalf of the purchaser, block 1032. This initiates the desired purchase, block 1034, based on the authentication, in a single action. In one example, a user interface of an authentication app may have a button or check box to "Buy More" with another box to enter a quantity. The user scans the item, and the purchase proceeds automatically as described. Thus this process includes the ability to purchase, for example, a larger quantity of items of the same (pre-established) class as the item being fingerprinted. This could, for example, include ordering a case of the same wine after drinking a bottle whose fingerprints are in the system. The actions or processes triggered by one or more authentication results, however, need not directly involve the item(s) authenticated, for example, as in the case of a purchase. The actions or processes are not limited in any way in this disclosure, except that they must be triggered automatically by a suitable processor or device. FIG. 11 presents a simplified, general flow diagram of this method. Here, one or more items are authenticated to produce authentication results, block 1104. The results are analyzed to select one or more predetermined actions or processes, block 1106. Finally, the process triggers the selected process(es), block 1108.

In some cases with no intermediaries, sellers may induct their own items into a database. For example, in the case of an artist selling their own work, the artist would be allowed to establish provenance of the art. FIG. 9B shows an illustrative process. Here, a seller requests to induct their own items, block 940. The request may be made to a suitable authentication service. The service preferably validates identity of the seller, and sets up an account with secure login, and appropriate permissions, block 942. Procedures such as 2FA should be used, to prevent unauthorized tampering with the authentication database. More generally, such precautions may be used for all vendor accounts established with an authentication service.

After user setup, the service may set up a database associated with the seller to store authentication data, block 944. The service receives a message from the seller to induct an object, block 946. Here we don't mean literally induct the physical object; rather, we mean to induct authentication data associated with the object, which data is supplied by the seller, into the authentication system database. At block 948, the system may generate metadata based on the request message, and store it in the database. Metadata may include a description, date stamp, etc. Further, the system extracts digital fingerprint data from the request, and stores it in a database record associated with the metadata, block 950. The foregoing steps may be repeated to induct additional objects into the database, block 960. In some embodiments, a batch of object fingerprints may be inducted in one transaction. This process completes at block 962.

A "blockchain" approach may be used in an embodiment of the present disclosure. That is, a database or digital ledger of authentic item fingerprints, and optionally supplemental information such as transactions or digital pedigree associated with the items, may be implemented in a distributed, shared network rather than a single clearinghouse or provider. The ledger may be updated with each subsequent event relevant to the items.

It will be obvious to those having skill in the art that many changes may be made to the details of the above-described embodiments without departing from the underlying principles of the disclosure. The scope of the present disclosure should, therefore, be determined only by the following claims.

The invention claimed is:

1. A method comprising:
acquiring a piece of digital image data of a portion of a physical object by scanning a portion of the object;
forming a digital fingerprint of the physical object, wherein forming the digital fingerprint includes selecting an authentication region captured in the piece of digital image data of the physical object and extracting at least one feature vector from the selected authentication region, wherein the feature vector includes multiple color or gray scale numeric values corresponding to areas within the selected authentication region, the numeric values including at least one of a sum, average, maximum, or other function of individual numeric values included in a sub-part of the selected authentication region;
storing the digital fingerprint in a database that stores multiple digital fingerprints; and
initiating a one action purchase of the physical object, wherein the one action purchase integrates an authentication process with a purchase of the physical object.

2. The method of claim 1, wherein the authentication process further comprises authenticating the physical object by querying the database based on the digital fingerprint of the physical object to obtain a result that includes an indication as to whether the digital fingerprint of the physical object matches a digital fingerprint previously stored in the database, and the method further comprises:
triggering an acceptance gesture to confirm the purchase of the physical object based on the digital fingerprint of the physical object matching a previously stored digital fingerprint.

3. The method of claim 2, wherein the result includes an indication of a confidence level of the result.

4. The method of claim 2, further comprising automatically performing a predetermined action based on a failure to match the digital fingerprint of the physical object with a previously stored digital fingerprint.

5. The method of claim 4, wherein the predetermined action includes identifying a seller of the physical object based on a unique identifier for the seller, and the method further comprises:
locating the physical object in an electronic catalog of the seller's products;
providing the one action purchase of the physical object; and
sending a message to the seller confirming the purchase of the physical object.

6. The method of claim 4, wherein the predetermined action includes generating a notification inviting a seller of the physical object to set up an account in an authentication service to facilitate the purchase of the physical object, and the method further comprises:
receiving a price for the physical object from the seller; and
providing the one action purchase of the physical object, wherein the physical object is purchased at the received price.

7. The method of claim 1, further comprising:
acquiring a piece of digital image data of a portion of a target object by scanning a portion of the target object;
forming a digital fingerprint of the target object based on the piece of digital image data of the target object;
identifying a seller of the target object using the digital fingerprint of the target object; and
authenticating the target object by querying the database based on the identified seller and the digital fingerprint of the target object to obtain a result that indicates the digital fingerprint of the target object matches the digital fingerprint of the physical object.

8. The method of claim 7, wherein forming the digital fingerprint of the target object includes selecting an authentication region captured in the piece of digital image data of the target object and extracting at least one feature vector from the selected authentication region, wherein the feature vector includes multiple color or gray scale numeric values corresponding to areas within the selected authentication region, the numeric values including at least one of a sum, average, maximum, or other function of individual numeric values included in a sub-part of the selected authentication region, and the method further comprises transmitting the digital fingerprint of the target object over a network to query the database based on the digital fingerprint of the target object.

9. The method of claim 1,
wherein the digital image data of the physical object captures at least one native feature of the physical object, and
wherein the digital fingerprint of the physical object is responsive to the at least one native feature that is independent from identification information included in any labels, tags, integrated materials, unique identification characters, codes, or other items that were added to the object for the purpose of identification.

10. The method of claim 1 further comprising:
placing an item of currency required to complete the purchase and the physical object in escrow;
authenticating the object by querying the database based on the digital fingerprint of the physical object to obtain a result that includes an indication as to whether the digital fingerprint of the physical object matches a digital fingerprint previously stored in the database; and
simultaneously releasing the item of currency and the physical object from escrow based on the digital fingerprint of the physical object matching a previously stored digital fingerprint.

11. The method of claim 1, further comprising:
placing an item of currency required to complete the purchase and the physical object in escrow;
transporting the physical object to a location of a buyer;
acquiring, at the location of the buyer, a second piece of digital image data of a portion of a physical object by scanning a portion of the object;
forming a second digital fingerprint of the physical object based on the second piece of digital image data;
authenticating the object by querying the database based on the second digital fingerprint to obtain a result that includes an indication as to whether the second digital fingerprint matches the digital fingerprint of the physical object previously stored in the database; and
simultaneously releasing the item of currency and the physical object from escrow based on the second digital fingerprint matching the digital fingerprint of the physical object.

12. The method of claim 11, further comprising rejecting the physical object based on the second digital fingerprint failing to match the digital fingerprint of the physical object.

13. An authentication system comprising:
a processor and memory connected to each other;
a database connected to the processor and memory, wherein the database stores multiple digital fingerprints;
a scanner connected to the processor and memory;
a network interface configured to communicate with one or more other components of the authentication system over a network; and
a plurality of lines of instructions stored in the memory and executed by the processor of the authentication system that is configured to:
acquire, from the scanner, a piece of digital image data of a portion of a physical object by scanning a portion of the object;
select an authentication region captured in the piece of digital image data of the physical object;
extract at least one feature vector from the selected authentication region, wherein the feature vector includes multiple color or gray scale numeric values corresponding to areas within the selected authentication region, the numeric values including at least one of a sum, average, maximum, or other function of individual numeric values included in a sub-part of the selected authentication region;
form a digital fingerprint of the physical object from the at least one feature vector; store the digital fingerprint of the physical object in the database; and
initiate a one action purchase of the physical object, wherein the one action purchase integrates an authentication process with a purchase of the physical object.

14. The system of claim 13, wherein the processor of the authentication system is further configured to:
query the database based on the digital fingerprint of the physical object to obtain a result that includes an indication as to whether the digital fingerprint of the physical object matches a digital fingerprint previously stored in the database; and
trigger an acceptance gesture to confirm the purchase of the physical object based on the digital fingerprint of the physical object matching a previously stored digital fingerprint.

15. The system of claim 13, wherein the processor of the authentication system is further configured to:
identify a seller based on a failure to match the digital fingerprint of the physical object with a stored digital fingerprint of a known authentic object;
locate the physical object in an electronic catalog of the seller's products; provide the one action purchase of the physical object; and
send a message to the seller confirming the purchase of the physical object.

16. The system of claim 13, wherein the processor of the authentication system is further configured to:
generate a notification based on a failure to match the digital fingerprint of the physical object with a previously stored digital fingerprint, wherein the notification invites a seller of the physical object to set up an account in an authentication service to facilitate the purchase of the physical object;
receive a price for the physical object from the seller; and
provide the one action purchase of the physical object, wherein the physical object is purchased at the received price.

17. The system of claim 13, further comprising a mobile device including the scanner and a processor and memory, wherein the processor and the memory are connected to each other and are connected to the scanner;
wherein the processor of the mobile device is configured to:
acquire a piece of digital image data of a portion of a target object by scanning a portion of the target object;
form a digital fingerprint of the target object based on the piece of digital image data of the target object;
identify a seller of the target object using the digital fingerprint of the target object;
transmit the digital fingerprint of the target object to the authentication system via the network to query the database based on the identified seller and digital fingerprint of the target object;
obtain a result from the query that indicates the digital fingerprint of the target object matches the digital fingerprint of the physical object; and
authenticate the target object based on the result.

18. The system of claim 13, wherein the processor of the authentication system is further configured to:
place an item of currency required to complete the purchase and the physical object in escrow;
query the database based on the digital fingerprint of the physical object to obtain a result that includes an indication as to whether the digital fingerprint of the physical object matches a digital fingerprint previously stored in the database;
obtain a result from the query that indicates the digital fingerprint of the physical object matches a previously stored digital fingerprint; and
simultaneously release the item of currency and the physical object from escrow based on the result.

19. The system of claim 13, wherein the processor of the authentication system is further configured to:
place an item of currency required to complete the purchase and the physical object in escrow;
receive the physical object at a location of a buyer;
acquire, at the location of the buyer, a second piece of digital image data of a portion of a physical object by scanning a portion of the object;
form a second digital fingerprint of the physical object based on the second piece of digital image data;
query the database based on the second digital fingerprint to obtain a result that includes an indication as to whether the second digital fingerprint matches the digital fingerprint of the physical object previously stored in the database;
obtain a result from the query that indicates the second digital fingerprint matches the digital fingerprint of the physical object; and
simultaneously release the item of currency and the physical object from escrow based on the result.

20. The system of claim 19, wherein the processor of the authentication system is further configured to:
obtain a result from the query that indicates the second digital fingerprint does not match the digital fingerprint of the physical object; and
reject the physical object based on the result.

* * * * *